United States Patent [19]
Birecki et al.

[11] Patent Number: 5,150,338
[45] Date of Patent: Sep. 22, 1992

[54] OPTICAL DISK READING AND WRITING SYSTEM HAVING MAGNETIC WRITE HEAD MOUNTED ON AN AIR-BEARING SLIDER

[75] Inventors: Henryk Birecki, Palo Alto; George M. Clifford, Jr., Los Altos Hills, both of Calif.

[73] Assignee: Hewlett-Packard Company, Palo Alto, Calif.

[21] Appl. No.: 472,517

[22] Filed: Jan. 30, 1990

Related U.S. Application Data

[63] Continuation-in-part of Ser. No. 392,161, Aug. 10, 1989, abandoned, and a continuation-in-part of Ser. No. 421,215, Oct. 13, 1989, abandoned.

[51] Int. Cl.⁵ .................. G11B 11/00; G11B 7/00; G11C 13/06
[52] U.S. Cl. .................. 369/13; 369/44.22; 365/122
[58] Field of Search .............. 369/13, 244, 255, 44.14, 369/44.15, 44.22; 360/104, 105, 106, 59, 114; 250/201.2; 365/122

[56] References Cited

U.S. PATENT DOCUMENTS

| | | | |
|---|---|---|---|
| 3,660,617 | 5/1972 | Hagopian | 360/123 |
| 3,894,180 | 7/1975 | Canino | 369/176 |
| 3,914,541 | 10/1975 | Elliott | 369/44.16 |
| 3,947,888 | 3/1970 | Jarsen | 369/111 |
| 4,006,294 | 2/1977 | Canino | 369/244 |
| 4,358,802 | 11/1982 | Jonsen | 369/72 |
| 4,414,592 | 11/1983 | Losee | 36/99.01 |
| 4,633,450 | 12/1986 | Gueugnon | 369/13 |
| 4,704,712 | 11/1987 | Siryj | 369/255 |
| 4,710,912 | 12/1987 | Greene | 369/244 |
| 4,851,942 | 7/1989 | Kumasaka | 360/103 |
| 4,862,437 | 8/1989 | Okada | 369/13 |
| 4,959,820 | 9/1990 | Horimai | 369/13 |
| 4,962,492 | 10/1990 | Mathildus | 369/13 |

FOREIGN PATENT DOCUMENTS

| | | |
|---|---|---|
| 3730969A1 | 3/1989 | Fed. Rep. of Germany . |
| 0066532 | 4/1982 | Japan ............ 369/13 |
| 0186214 | 11/1982 | Japan ............ 369/13 |
| 58-57638 | 4/1983 | Japan ............ 369/44.22 |
| 0261052 | 5/1986 | Japan ............ 369/13 |

Primary Examiner—John W. Shepperd
Assistant Examiner—Tan Nguyen

[57] ABSTRACT

A system for reading and writing binary information onto at least one optical recording surface of a magneto-optical disk includes a hydrodynamic bearing for traveling above the optical recording surface of the magneto-optical disk, an objective lens carried by the hydrodynamic bearing for focusing laser light to heat selected areas on the optical recording surface, and a magnetic writing head also carried by the hydrodynamic bearing for recording selected magnetic orientations, representing binary states, onto the heated areas on the magneto-optical memory disk.

5 Claims, 3 Drawing Sheets

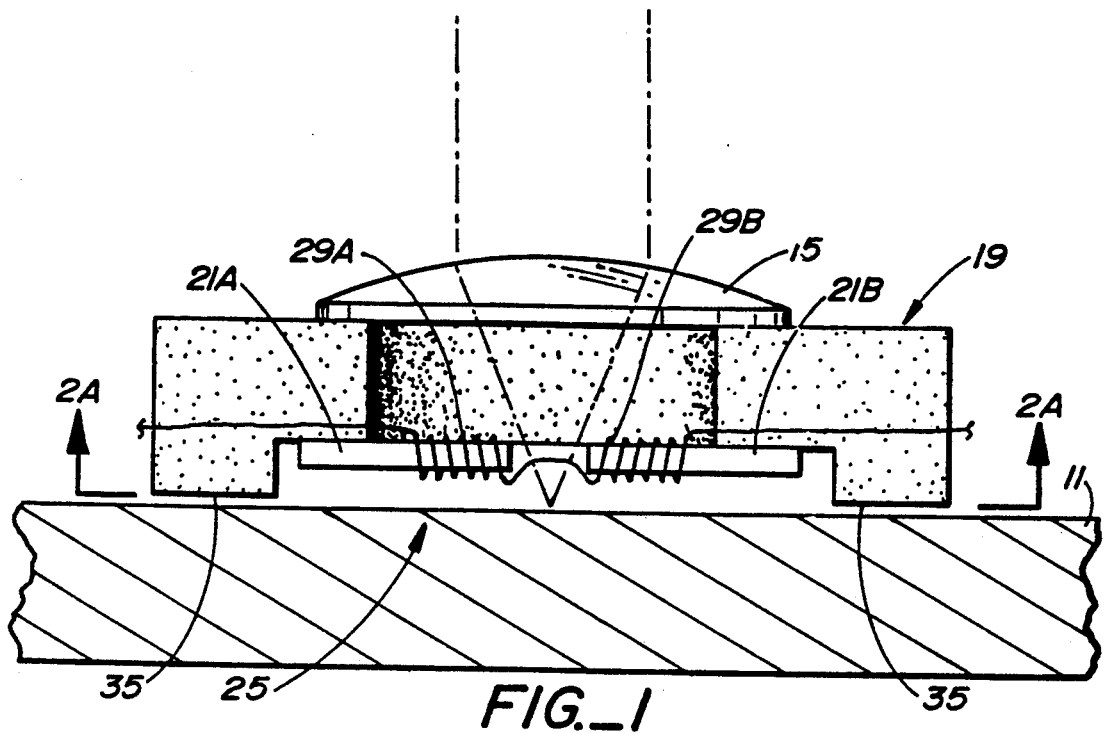
FIG._1
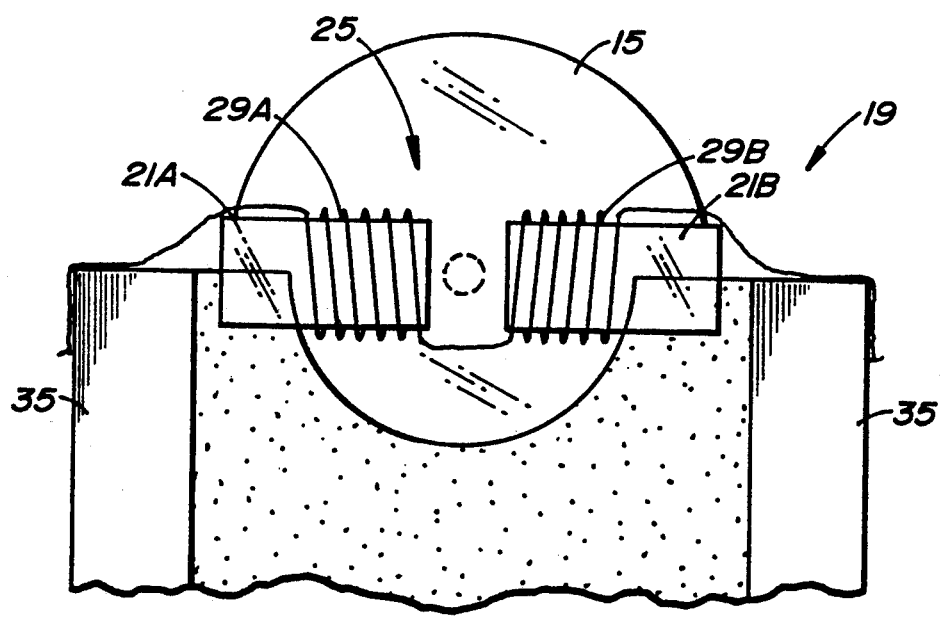
FIG._2A

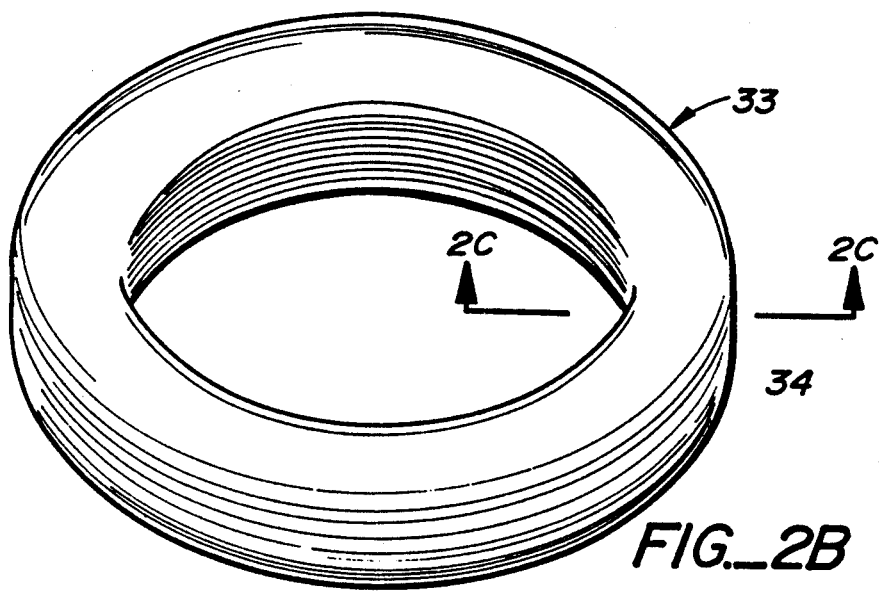
FIG._2B
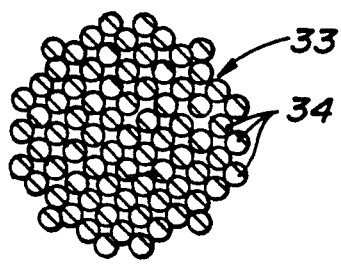
FIG._2C
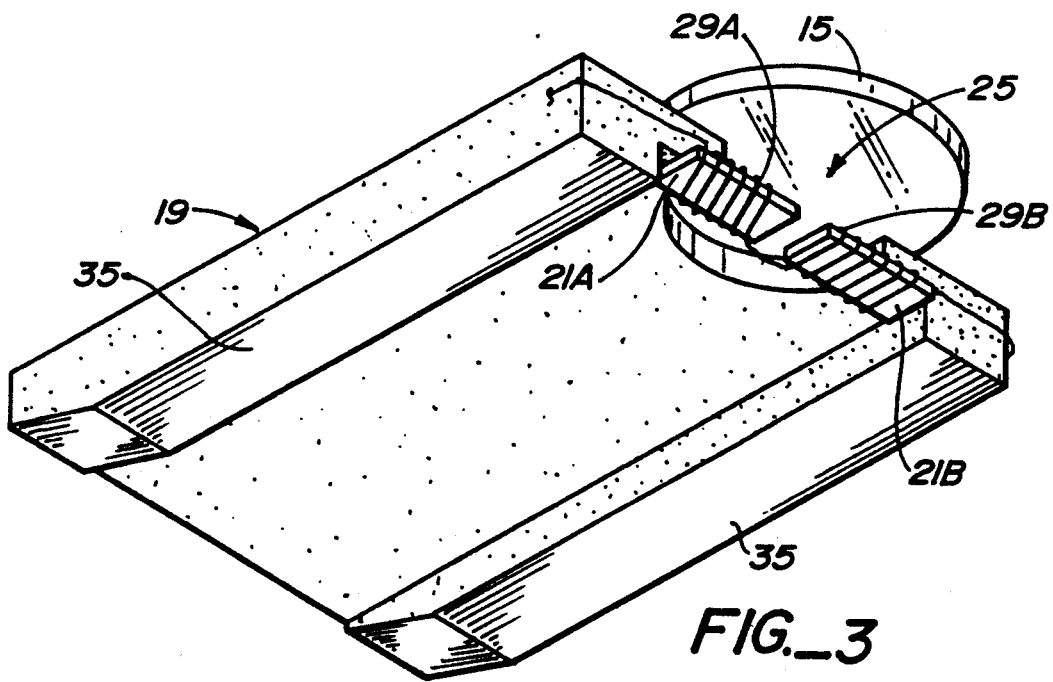
FIG._3

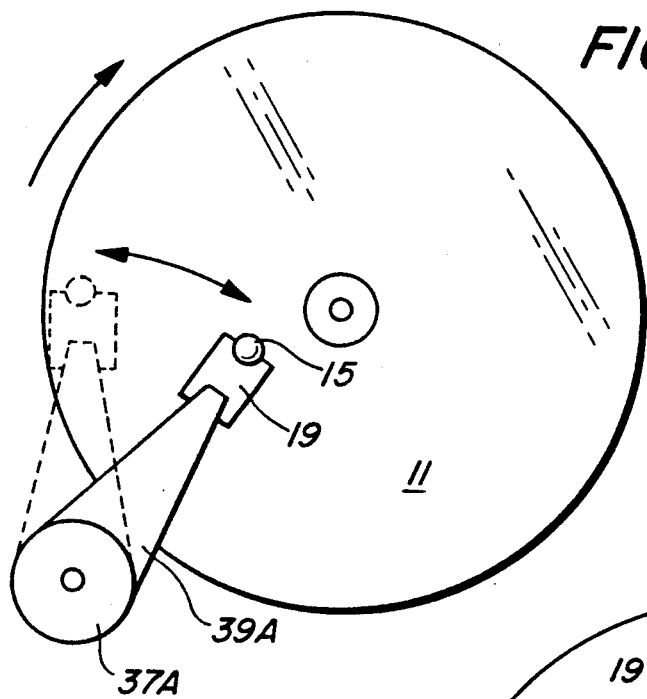
FIG._4A.
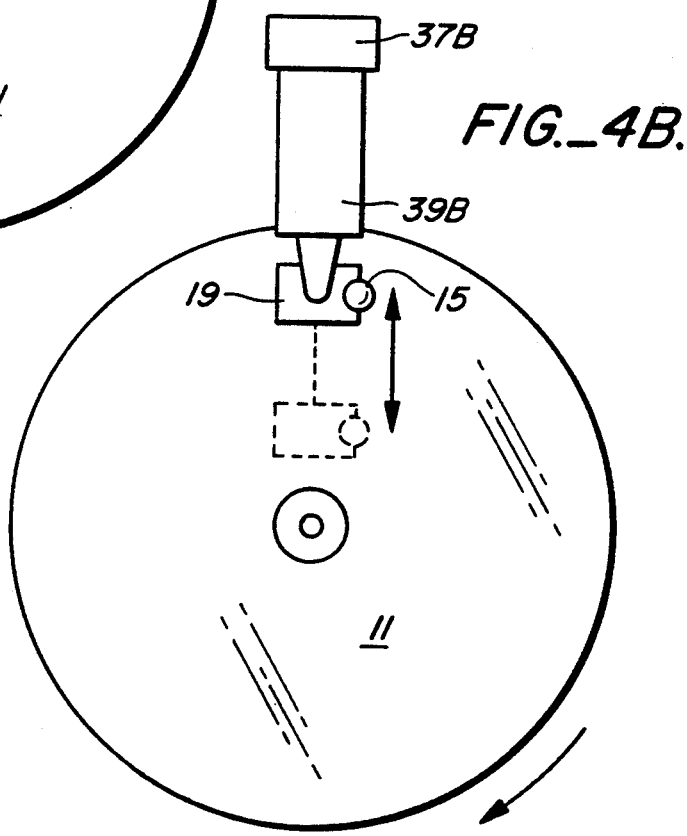
FIG._4B.

OPTICAL DISK READING AND WRITING SYSTEM HAVING MAGNETIC WRITE HEAD MOUNTED ON AN AIR-BEARING SLIDER

RELATED APPLICATIONS

This application is a continuation-in-part of U.S. Pat. Application Ser. Nos. 07/392,161 and 07/421,215, filed Aug. 10, 1989 and Oct. 13, 1989 both now abandoned respectively and commonly assigned herewith.

BACKGROUND OF THE INVENTION

1. Field of the Invention

The present invention generally relates to systems for reading and writing binary information onto magneto-optical memory disks and, more particularly, to such systems that employ modulated magnetic heads for direct overwriting.

2. State of the Art

Magneto-optical memory disks each contain a very large number of discrete magnetic sites, or "domains," that are arranged almost side-by-side in concentric or spiral data tracks on a common recording surface or "data plane." Although a data plane on a magneto-optical disk is normally parallel to the face of the disk, it is not necessary that a data plane lay on the disk's surface. A transparent magneto-optical disk, for example, can have a data plane that is arranged between its faces. Typically, a data plane at a disk's surface is covered by a thin protective coating.

When a focused beam of linearly polarized light is reflected from a magnetic domain on the data plane of a magneto-optical memory disk, the polarity of the domain (i.e., its magnetic moment) can cause the electric field vector of the reflected light to be rotated. By making use of this phenomenon, information can be stored on a magneto-optical disk by purposefully magnetizing patterns of domains along tracks on the disk's recording surface. Then, the polarization of the light reflected from the disk's recording surface can be coded to retrieve the stored binary information when reading the disk.

In the magneto-optical memory disk recording art, the process of purposefully magnetizing domains along tracks on a recording surface is referred to as "writing". To write information onto a magneto-optical memory disk, it is necessary to maintain the point of focus of a laser beam coincident with the disk's recording surface as the disk rotates. The laser beam functions to heat individual areas along the recording tracks to a temperature sufficient to lower their coercivity to a point where their magnetic moment can be easily altered by a magnetic recording head, thereby forming magnetic domains. The recorded magnetic moments remain after the domains cool.

Because of the minute size of magnetic domains on magneto-optical memory disks, it is critical to precisely maintain the position of the point of focus of a laser beam on the data plane through an objective lens when writing onto, and reading from a magneto-optical disk. Conventionally, systems for maintaining the point of focus of a laser beam on the recording surface of a magneto-optical disk include an objective lens mounted on a voice-coil motor. In operation, the voice coil motor is controlled to selectively move the lens toward and away from the disk surface as required to compensate for changes in the axial position of the data plane of a disk.

Axial-direction disturbances to the point of focus of an objective lens relative to the data plane of an optical memory disk can be caused by various factors. For example, axial-direction disturbances can be caused by temperature changes, by vibrations, by mechanical shocks and by other environmental factors. In addition, the location of the point of focus of an objective lens relative to the data plane of an optical memory disk can be disturbed by axial-direction variations in disc geometry due, for instance, to factors such as disk warpage, droop, waviness, and thickness variations.

As mentioned above, writing of binary information onto a magneto-optical memory disk requires the use of a magnetic head. In conventional writing operations for magneto-optical memory disks, a laser is modulated (i.e., switched) so that its light heats only areas on a rotating magneto-optical disk that have been previously magnetically erased. As the disk is rotated during the writing operation, the heated areas are exposed to a magnetic writing field whose orientation is opposite to the orientation of the erased areas. As a result, selected magnetic domains are produced, or written, such that the direction of their magnetic moment corresponds to the direction of the magnetic writing field.

One known alternative to the above-described technique for writing binary information onto magneto-optical disks is the so-called "direct overwriting" technique. Direct overwriting has the benefit that it can be applied to areas of a magneto-optical disk that have not been previously erased magnetically, thus reducing the time required to write to a disk by eliminating the erasing operation that normally is required before writing. In conventional practice, direct overwriting systems for magneto-optical memory disks include a laser source which is mounted on one side of a disk in precise alignment with a magnetic head which is mounted on the opposite side of the disk. More particularly, alignment between the magnetic head and the laser source must be such that the magnetic field and the point of focus of the laser light are coincident on the data plane of the disk.

SUMMARY OF THE INVENTION

Generally speaking, the present invention provides improved systems for reading and writing binary information onto optical recording surfaces of magneto-optical disks. More particularly, the present invention provides improved direct overwriting systems for reading and writing binary information onto optical recording surfaces of magneto-optical disks.

In the preferred embodiment of the present invention, a system for reading and writing binary information onto a magneto-optical memory disk includes a hydrodynamic bearing that travels above the optical recording surface of the magneto-optical disk, an objective lens carried by the hydrodynamic bearing for focusing laser light to heat selected areas on the optical recording surface, and a magnetic writing head carried by the hydrodynamic bearing for recording selected magnetic orientations, representing binary states, onto the heated areas, thereby establishing readable magnetic domains on the magneto-optical memory disk.

In practice, the hydrodynamic bearing preferably comprises an air-bearing slider that rides above the surface of the magneto-optical memory disk at a generally constant distance. The magnetic writing head preferably includes a conductor coil or toroid arranged such that lines of magnetic flux are directed nearly perpendicular to the plane of the recording surface.

BRIEF DESCRIPTION OF THE DRAWINGS

The present invention can be further understood by reference to the following description and appended drawings which illustrate the preferred embodiments of the invention. For purposes of clarity, identical parts are given the same reference numbers in the various drawing figures. In the drawings:

FIG. 1 is a schematic diagram of a system according to the present invention for writing information onto a recording surface of a magneto-optical disk;

FIG. 2A is a bottom view of FIG. 1 showing a detailed view of one example of a magnetic recording head for use with the magneto-optical disk writing system;

FIG. 2B is a detailed view of another example of a magnetic recording head for use with the magneto-optical disk writing system of FIG. 1;

FIG. 2C is a cross-sectional detail of the magnetic recording head of FIG. 2B taken along the section lines 2C—2C;

FIG. 3 is a pictorial view of an exemplary embodiment of an air-bearing slider for use with the magneto-optical disk writing system of FIG. 1; and FIGS. 4A and 4B are plan views of two alternative embodiments of components for use with the magneto-optical disk writing system of FIG. 1.

DETAILED DESCRIPTION OF THE PREFERRED EMBODIMENTS

FIG. 1 generally shows a direct overwriting system for writing and reading binary information on the data plane of a magneto-optical disk 11 as the disk rotates about its central axis. In the illustrated embodiment, an objective lens 15 is mounted on an air-bearing slider, designated generally by the number 19, to ride near the disk surface. As will be explained further below, the air-bearing slider can be connected to a conventional actuator that positions the slider over selected data tracks on the disk's data plane.

As shown in FIGS. 1, 2A and 3, a pair of magnetic pole pieces 21A and 21B are mounted on air-bearing slider 19 between lens 15 and the surface of disk 11. More particularly, the two pole pieces are separate from one another, and are mounted end-to-end with a space therebetween for allowing laser light to pass through the gap between the opposing ends. Further in this construction, a conductor is wound in a first coil 29A that surrounds about pole piece 21A in one direction and is wound in a second coil 29B that surrounds pole piece 21B in the opposite direction. It will be noted that the centerline of coils 29A and 29B are in alignment and are generally parallel to the surface of disk 11. The purpose of the pole pieces is to provide a high magnetic permeability core for a magnetic head, generally designated by the numeral 25.

FIGS. 2B and 2C show an alternative construction wherein magnetic head 25 comprises a toroidal coil 33. It should be noted that the toroidal coil is disposed with its central axis generally aligned the with the optical centerline of the objective lens 15 to allow laser light to reach the recording surface via the central aperture in the toroid. It should also be noted that the toroidal coil is comprised of conductors 34 that are wound in a circular pattern which is generally parallel to the objective lens.

Operation of magnetic head of FIGS. 1, 2A and 3 will now be described. In operation, current is provided through each of the two coils 29A and 29B, thereby establishing two opposed magnetic fields. That is, because the two coils are wound in opposite directions, they establish oppositely directed magnetic fields. Thus, midway between the opposed ends of the pole pieces 21A and 21B, lines of magnetic flux from the two fields are directed nearly perpendicular to the plane of the recording surface of magneto-optical memory disk 11. In practice, the direction of current flow through coils 29A and 29 is selected according to the desired orientation to be established (i.e., written) in the area underlying the magnetic head at a given instant.

Operation of a magnetic head comprised of the toroidal coil of FIGS. 2B and 2C is similar to that described above. In particular, current flow through conductors 34 establishes a magnetic field that is directed through the center of the toroid. Accordingly, the axis of the toroid and the axis of the laser beam are the same, and both are directed nearly perpendicular to the plane of the recording surface of magneto-optical memory disk 11 at the point of focus of the laser. Also in this embodiment, the direction of current flow through conductors 34 is selected according to the desired orientation to be established in the area underlying the magnetic head at a given instant.

As shown in FIG. 3, air-bearing slider 19 is a hydrodynamic bearing. Such bearings are sometimes referred to as "flying heads" because they are supported by flying over a rotating disk on a cushion of pressurized gas, usually air, that forms between air bearing surfaces 35 and the face of the optical memory disk. The pressurized cushions are created by gas which is carried along a disk surface during rapid rotation of the disk, usually at velocities ranging from about five to about thirty-five meters per second.

For a given design of air-bearing slider 19, the distance that separates the undersurface of the slider from the adjacent face of the magneto-optical memory disk remains relatively constant at a given velocity of the disk. In practice, substantially constant spacing is maintained even in the presence of axial-direction variations in disk geometry (e.g., disk warpage). The spacing normally varies less than about one or two microns, and can be made to vary an order of magnitude less (i.e., within the range of about 0.1 to about 0.2 microns) with appropriate slider design.

Because objective lens 15 is carried by an air-bearing slider such as the one shown in FIG. 3, the objective lens is maintained at a substantially constant spacing from the adjacent face of magneto-optical disk 11. Accordingly, the point of focus of the objective lens is maintained at a generally constant depth within the optical disk, or on the disk's surface, regardless of variations in the disk surface. (As used herein, the term "point of focus" means any point within the depth of focus of a lens.) The system, therefore, can be described as self-focusing or as passively focusing.

FIGS. 4A and 4B show alternative embodiments of systems for positioning the air-bearing slider across the face of disk 11. In FIG. 4A, the air-bearing slider is connected to a rotary-type actuator 37A by a member 39A. In FIG. 4B, the air-bearing slider is connected to a linear-type actuator 37B by a member 39B. In operation of both embodiments, the actuators are driven to position the point of focus of the objective lens above selected data tracks on the data plane of the optical disk.

As described in co-pending applications, Ser. Nos. 07/392,161 and 07/421,215, the entire disclosure of which is incorporated herein by reference, the system of FIG. 1 can be used for reading binary information from the data plane of disk 11. As also described in the co-pending application, auxiliary control systems can be provided for maintaining the beam of laser light such that the point of focus of the objective lens is coincident with a data plane that is not on the surface of a magneto-optical memory disk. The auxiliary control systems can be used, for example, to compensate for thickness and other variations in the optical memory disk. Also, the auxiliary control systems can be used for compensate for changes in the rotational speed of magneto-optical memory disks.

I situations where it is desired to record on two surfaces of a magneto-optical memory disk, two systems such as shown in FIG. 1 can be provided such that one system is dedicated to each surface of the disk.

The foregoing has described the principles, preferred embodiments and modes of operation of the present invention. However, the present invention should not be construed as being limited to the particular embodiments discussed. Accordingly, the above-described embodiments should be regarded as illustrative rather than restrictive, and it should be appreciated that workers skilled in the art may make variations in those embodiments without departing from the spirit or scope of the present invention as defined by the following claims.

What is claimed is:

1. A system for reading and writing binary information onto a recording surface of a magneto-optical memory disk, comprising:

hydrodynamic bearing means including an air-bearing slider that travels above the surface of the magneto-optical memory disk at a generally constant distance;

objective lens means carried by the hydrodynamic bearing means for focusing laser light for heating selected areas of the optical recording surface sufficiently that the coercivity of the heated areas is lowered for allowing magnetic domains in the heated areas to be established;

magnetic writing head means, including a pair of first and second magnetic pole pieces that are mounted on the undersurface of the air-bearing slider between the objective lens means and the surface of the magneto-optical disk, that are carried by the hydrodynamic bearing means for recording magnetic domains, representing binary states, on the heated areas on the magneto-optical disk, the first and second magnetic pole pieces being mounted end-to-end, parallel to the disk surface, with a space therebetween, above which the objective lens means is mounted, for focussing laser light through the gap between the opposing ends;

the magnetic writing head means further including a conductor means which is wound in a first coil about the first pole piece in one direction and which is wound in a second coil about the second pole piece in the opposite direction; and actuator means for positioning the point of focus of the objective lens means above selected data tracks on the data plane of the magneto-optical disk.

2. A system for reading and writing binary information onto two optical recording surfaces of a single magneto-optical memory disk comprising:

hydrodynamic bearing means including an air-bearing slider that travels above the two recording surfaces of the magneto-optical memory disk at a generally constant distance;

objective lens means carried by each of the two hydrodynamic bearing means for focusing laser light to heat selected areas on respective ones of the two optical recording surfaces; and magnetic writing head means carried by each of the two hydrodynamic bearing means for recording selected magnetic orientations onto the heated areas on the two optical recording surfaces on the magneto-optical disk, the magnetic writing head means, including a pair of first and second magnetic pole pieces that are mounted on the undersurface of the air-bearing slider between the objective lens means and the surface of the magneto-optical disk, the first and second magnetic pole pieces being mounted end-to-end, parallel to the disk surface, above which the objective lens means is mounted, for focussing laser light through the gap between the opposing ends;

the magnetic writing head means further including a conductor means which is wound in a first coil about the first pole piece in one direction and which is wound in a second coil about the second pole piece in the opposite direction.

3. A system according to claim 2 further including a pair of actuator means for positioning the points of focus of each of the objective lens means above selected data tracks on the data planes of the magneto-optical disk.

4. A system for reading and writing binary information onto a recording surface of a magneto-optical memory disk, comprising:

hydrodynamic bearing means including an air-bearing slider that travels above the surface of the magneto-optical memory disk at a generally constant distance;

objective lens means carried by the hydrodynamic bearing means for focusing laser light for heating selected areas of the optical recording surface sufficiently that the coercivity of the heated areas is lowered for allowing magnetic domains in the heated areas to be established;

magnetic writing head means, including a pair of first and second magnetic pole pieces that are mounted on the undersurface of the air-bearing slider between the objective lens means and the surface of the magneto-optical disk, that are carried by the hydrodynamic bearing means for recording magnetic domains, representing binary states, on the heated areas on the magneto-optical disk, the first and second magnetic pole pieces being mounted end-to-end, parallel to the disk surface, above which the objective lens means is mounted, for focussing laser light through the gap between the opposing ends;

the magnetic writing head means further including a conductor means which is wound in a first coil about the first pole piece in one direction and which is wound in a second coil about the second pole piece in the opposite direction; and actuator means for positioning the point of focus of the objective lens means above selected data tracks on the data plane of the magneto-optical disk.

5. A system according to claim 4 further including an actuator means for positioning the point of focus of the objective lens means above selected data tracks on the data plane of the magneto-optical disk.

* * * * *